(12) United States Patent
Werner et al.

(10) Patent No.: US 11,817,751 B2
(45) Date of Patent: Nov. 14, 2023

(54) METHOD OF FIRMLY CONNECTING A SHAFT TO A ROTOR-HOUSING PART, AND ROTOR-HOUSING PART

(71) Applicant: PWO AG, Oberkirch (DE)

(72) Inventors: Patrick Werner, Oberkirch (DE); Nicolai Schindler, Oberkirch (DE)

(73) Assignee: PWO AG, Oberkirch (DE)

( * ) Notice: Subject to any disclaimer, the term of this patent is extended or adjusted under 35 U.S.C. 154(b) by 88 days.

(21) Appl. No.: 17/169,797

(22) Filed: Feb. 8, 2021

(65) Prior Publication Data

US 2021/0254669 A1   Aug. 19, 2021

(30) Foreign Application Priority Data

Feb. 17, 2020   (DE) .................... 10 2020 104 076.8

(51) Int. Cl.
| | | |
|---|---|---|
| H02K 15/02 | (2006.01) | |
| F16C 35/07 | (2006.01) | |
| F16C 35/04 | (2006.01) | |
| H02K 1/28 | (2006.01) | |
| H02K 5/16 | (2006.01) | |
| H02K 7/00 | (2006.01) | |
| B21D 39/06 | (2006.01) | |
| B21H 5/00 | (2006.01) | |

(52) U.S. Cl.
CPC ............ *H02K 15/02* (2013.01); *B21D 39/06* (2013.01); *B21H 5/005* (2013.01); *F16C 35/045* (2013.01); *F16C 35/07* (2013.01); *H02K 1/28* (2013.01); *H02K 5/16* (2013.01); *H02K 7/003* (2013.01); *H02K 15/028* (2013.01)

(58) Field of Classification Search
CPC ........... B25J 9/108; H02K 15/02; H02K 1/28; H02K 5/16; H02K 7/003; H02K 15/028; H02K 1/30; H02K 5/04; H02K 15/14; B21D 39/06; B21H 5/005; F16C 35/045; F16C 35/07; F16C 2380/26
See application file for complete search history.

(56) References Cited

U.S. PATENT DOCUMENTS

| | | | | |
|---|---|---|---|---|
| 3,643,119 | A * | 2/1972 | Lukens | H02K 9/06 310/60 R |
| 4,474,562 | A * | 10/1984 | Heurich | F16H 7/1281 29/520 |
| 4,749,131 | A * | 6/1988 | Katchka | F23D 14/46 29/517 |
| 5,312,080 | A * | 5/1994 | Mazur | B21D 22/04 248/300 |
| 2005/0039318 | A1* | 2/2005 | Feis | B21K 25/00 29/512 |

(Continued)

*Primary Examiner* — Lee A Holly
(74) *Attorney, Agent, or Firm* — Jason H. Vick; Sheridan Ross, PC

(57) ABSTRACT

In a method for firmly connecting a shaft to a rotor-housing part, the rotor-housing part is provided having a bearing flange and the shaft is provided having a recess, extending in the circumferential direction of the shaft, on an outer circumference of the shaft. The shaft is inserted into the bearing flange such that the recess and the bearing flange overlap one another. Material of the bearing flange is introduced into the recess. With the connection, created in this way, between the shaft and bearing flange, a high press-out force is achieved.

11 Claims, 2 Drawing Sheets

(56) References Cited

U.S. PATENT DOCUMENTS

2013/0172142 A1\* 7/2013 Smetana ................. F16H 48/36
 475/331
2019/0135475 A1\* 5/2019 Triebel ..................... H02K 5/10
2021/0339384 A1\* 11/2021 Handfest ............... F16C 35/077

\* cited by examiner

METHOD OF FIRMLY CONNECTING A SHAFT TO A ROTOR-HOUSING PART, AND ROTOR-HOUSING PART

CROSS REFERENCES TO RELATED APPLICATIONS

This application claims priority from German patent application No. 10 2020 104 076.8, filed on 17 Feb. 2020. The entire content of this priority application is incorporated herein by reference.

FIELD OF THE INVENTION

The invention relates to a method for firmly connecting a shaft to a rotor-housing part. The invention also relates to a rotor-housing part that has a bearing flange to which a shaft is firmly connected.

A rotor-housing part according to the present invention can be in particular part of a rotor of an electric motor. In this case, this can be for example the electric motor of a fan that is provided in a motor vehicle for example as a component of the engine cooling system.

BACKGROUND

The connection between the shaft and bearing flange of the rotor-housing part has to be of such a kind that forces acting axially on the shaft do not cause the shaft to shift relative to the bearing flange, not even to a small amount of play. A force acting axially on the shaft and causing the shaft to shift relative to the bearing flange is also referred to as a press-out force. Therefore, the connection technology between the shaft and bearing flange has to be of such a kind that it affords sufficient resistance to high press-out forces, i.e. has a high press-out force.

In previous methods for firmly connecting a shaft to a rotor-housing part, the shaft is inserted into the bearing flange with an interference fit. The press-out forces that are achievable here are dependent on the axial length of the bearing flange, the surface roughness of the bearing flange and of the shaft, and the oversize of the shaft. However, the press-out forces that are achievable with an interference fit may be too low, depending on the requirements.

Although, by means of a longer bearing flange, the press-out force can be increased, there are limits to the length of the bearing flange. When the rotor-housing part is manufactured as a formed sheet-metal part from a metal blank, and the bearing flange is produced by punching and plunging a bottom portion of the rotor-housing part, the achievable axial length of the bearing flange tends to be low, and is for example 1 to 2 cm. Increasing the roughness of the shaft and/or bearing flange does not result in a considerable increase in the achievable press-out force, either. The press-out force could be increased considerably by welding the shaft to the bearing flange, but this requires an additional method step and possibly the use of an additive.

SUMMARY

The invention is based on the object of providing a method for firmly connecting a shaft to a rotor-housing part, with which a high press-out force is achieved even with a bearing flange of short axial length.

The invention is furthermore based on the object of providing a rotor-housing part having a firmly connected shaft, wherein the shaft exhibits high resistance to axial shifting relative to the bearing flange.

According to the invention, a method is provided for firmly connecting a shaft to a rotor-housing part, the method comprising providing the rotor-housing part having a bearing flange, providing the shaft having a recess, extending in the circumferential direction of the shaft, on an outer circumference of the shaft, inserting the shaft into the bearing flange, and introducing material of the bearing flange into the recess.

The method according to the invention leads, as a result of an at least partial form fit between the material of the bearing flange and of the shaft, to an increase in the press-out force, i.e. to an increase in the resistance to shifting of the shaft relative to the bearing flange. To this end, the shaft is provided having a recess extending in the circumferential direction of the shaft. The recess can have for example the form of a relief groove or slot. It is also possible for a plurality of recesses to be provided in an axially spaced-apart manner on the outer circumference of the shaft. Furthermore, provision is made according to the invention that material of the bearing flange is introduced into the recess. The introduction of material is carried out preferably by forming the bearing flange at the level of the recess. When the shaft has a plurality of recesses axially distributed on the outer circumference, provision may be made to introduce material of the bearing flange at a plurality of points of the latter into the recesses.

The recess does not have to be completely filled with material of the bearing flange. An increase in the press-out force is already achieved when the recess is only partially filled with material of the bearing flange.

As a result of the recess on the outer circumference of the shaft and the introduction of material of the bearing flange into the recess, not only is an at least partial form fit between the shaft and bearing flange achieved, but also the surface of the contact region of the shaft with the bearing flange is increased, with the result that the force fit or friction fit between the shaft and bearing flange is increased, this likewise increasing the resistance to axial shifting of the shaft.

A further advantage of the method according to the invention is that a complicated process such as welding the shaft to the bearing flange is not necessary. Yet another advantage of the method according to the invention is that material of the bearing flange can be introduced into the recess by means of a cold forming process. Thus, the rotor-housing part, including the connection of the rotor-housing part to the shaft, can be produced solely by cold forming processes, such that the advantages of work-hardening can be exploited.

The introduction of material of the bearing flange into the recess of the shaft may comprise the forming of a bead, which may be in the form of a full or half bead, into the bearing flange from an outer side of the bearing flange. A full bead is formed when the recess is spaced apart from the free end of the bearing flange. A half bead is formed when the recess is located directly at the end of the bearing flange.

The full or half bead may extend around the entire circumference in the circumferential direction of the bearing flange.

The introduction of material of the bearing flange into the recess is carried out preferably by means of a roller burnishing tool.

Roller burnishing the bearing flange in order to introduce material thereof into the recess is advantageously able to be carried out easily. Moreover, by way of roller burnishing, the material of the bearing flange can be introduced into the recess uniformly in the circumferential direction, and work-hardening of the material of the bearing flange in the recess is brought about.

In other configurations, the introduction of material of the bearing flange into the recess can be carried out by means of a slider, or a forming tool, or a pressing tool, or plier tool.

Preferably, the recess extends around the entire circumference in the circumferential direction of the shaft.

It is advantageous here that, on account of the full rotational symmetry when the shaft is inserted into the bearing flange, it is not necessary to consider a particular rotary position of the shaft for the subsequent operation of introducing material of the bearing flange into the recess.

Furthermore, it is preferred when the shaft is provided having an oversize with regard to the bearing flange, and the insertion of the shaft into the bearing flange comprises pressing the shaft into the bearing flange.

It is advantageous here that a part of the resistance to shifting is provided by the interference fit of the shaft in the bearing flange, while the material of the bearing flange that is introduced into the recess increases the resistance to shifting of the shaft relative to the bearing flange to the press-out force to be achieved. As a result of the combination of an interference fit and a form fit, the resistance to shifting of the shaft relative to the bearing flange is thus distributed over the entire contact face of the shaft against the bearing flange.

Preferably, the rotor-housing part is provided as a formed sheet-metal part and the bearing flange is produced by punching and plunging a bottom portion of the formed sheet-metal part.

As a whole, it is thus possible for the rotor-housing part, including the process of firmly connecting the shaft to the bearing flange, to be accomplished by forming processes, in particular cold forming processes.

Preferably, as a result of the introduction of material of the bearing flange into the recess, at least 30% of the recess, preferably at least 50% of the recess, is filled with the material of the bearing flange.

As already mentioned above, it is not necessary for the recess to be completely filled with material of the bearing flange in order to achieve a high press-out force. The degree of filling of the recess with material of the bearing flange can thus be adapted to the press-out force to be achieved.

The method according to the invention is suitable in particular when the axial length of the bearing flange is small, in particular when the axial length of the bearing flange is less than half the axial length of the shaft.

Furthermore, according to the invention, a rotor-housing part is provided, in particular a rotor-housing part of an electric motor, comprising a bearing flange and a shaft, wherein the shaft is inserted into the bearing flange and firmly connected thereto, wherein the shaft has a recess, extending in the circumferential direction of the shaft, on an outer circumference of the shaft, and wherein material of the bearing flange engages in the recess.

The rotor-housing part according to the invention has the same advantages as those described above in relation to the method. The rotor-housing part according to the invention can have structural configurations that result from the above-described configurations of the method according to the invention.

A press-out force of the shaft in at least one press-out direction is preferably at least 5 kN, preferably at least 7 kN, at a temperature of 23° C.

Such press-out forces cannot be achieved by an interference fit of the shaft in the bearing flange alone, in particular when the bearing flange has only a small axial length.

Further advantages and features will become apparent from the following description and the appended drawings. It goes without saying that the features mentioned above and those yet to be explained below are usable not only in the combination specified in each case but also in other combinations or on their own, without departing from the scope of the present invention.

BRIEF DESCRIPTION OF THE DRAWINGS

Exemplary embodiments of the invention are described in more detail in the following text with reference to the drawing, in which.

EMBODIMENTS

Figure 1:
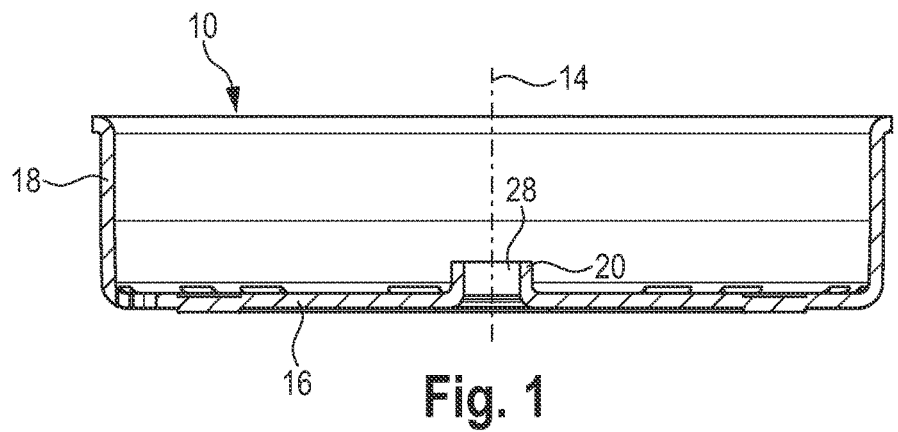
FIG. 1 shows a section through a rotor-housing part according to one stage of a method for firmly connecting a shaft to the rotor-housing part.
Figure 2:
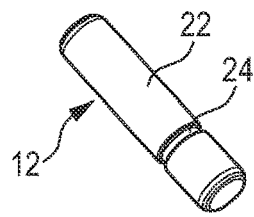
FIG. 2 shows a perspective view of a shaft that is intended to be connected to the rotor-housing part in FIG. 1.

FIG. 1 shows a rotor-housing part 10, to which a shaft 12, shown in FIG. 2, is intended to be firmly connected. The rotor-housing part 10 is formed in a rotationally symmetric manner with respect to an axis 14. The rotor-housing part 10 according to FIG. 1 may have been manufactured in particular by sheet-metal forming from a metal blank, for example a steel or aluminium blank. The rotor-housing part 10 has a bottom 16 and a wall 18, extending away from the bottom 16, which wall extends over the full circumference about the axis 14.

The pot-shaped rotor-housing part 10 may be produced for example by deep drawing from a metal blank.

The rotor-housing part 10 also has a bearing flange 20, which is configured in the form of a collar at the bottom 16 of the rotor-housing part 10 integrally or in one piece with the bottom 16. The bearing flange 20 may be formed by punching and plunging a bottom portion of the bottom 16.

The shaft 12 is in the form of a peg 22. The shaft 12 has a recess 24, extending in the circumferential direction of the shaft 12, on an outer circumference of the shaft 12. The recess 24 is configured in the form of a relief groove or slot and may have a depth of about 0.3 mm to 1 mm and an axial width of about 1 mm. The pin 22 may have a diameter of about 1 cm. The shaft 12 has a much greater length than the bearing flange 20, and specifically, in the exemplary embodiment shown, a length that is more than five times greater. The length of the bearing flange 20 may be about 1 cm or somewhat less.

Figure 3:
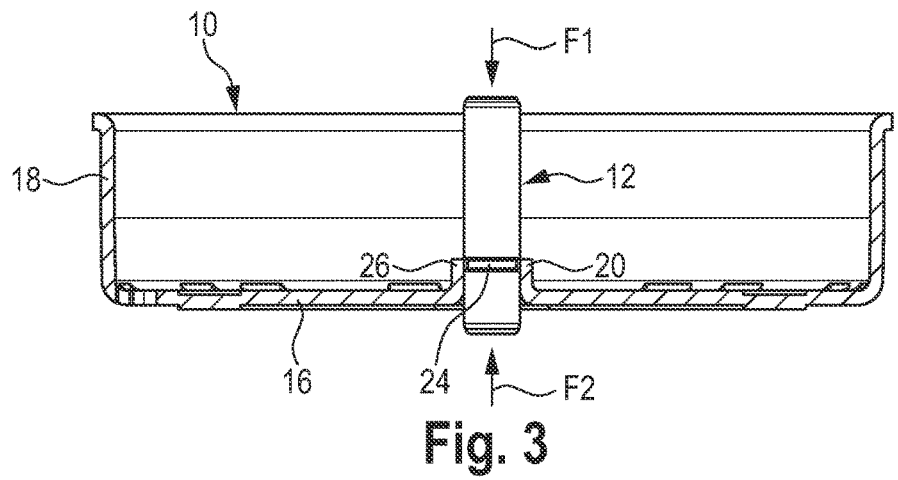
FIG. 3 shows a section corresponding to FIG. 1, wherein the shaft has been inserted into a bearing flange of the rotor-housing part in a further stage of the method.

After the rotor-housing part 10 has been provided, according to FIG. 3, the shaft 12 is inserted into the bearing flange 20. The shaft 12 is inserted into the bearing flange 20 such that the recess 24 of the shaft 12 and the bearing flange 20 overlap. In the exemplary embodiment shown here, the shaft 12 is inserted such that the recess 24 is located inside one end 26 of the bearing flange 20.

The shaft 12 may be provided having an oversize with respect to the clear width of the opening 28 in the bearing flange. In this case, the shaft 12 is pressed into the bearing flange 20. With such an interference fit of the shaft 12 in the bearing flange 20, it is possible to achieve press-out forces that may sometimes be too low. In FIG. 3, arrows $F_1$ and $F_2$ indicate forces that act axially on the shaft 12 and, when they overcome the resistance to shifting provided by the interference fit, can result in axial shifting of the shaft 12 relative to the bearing flange 20, this being intended to be avoided, however. A force that overcomes the resistance to shifting is referred to as a press-out force.

Figure 4:
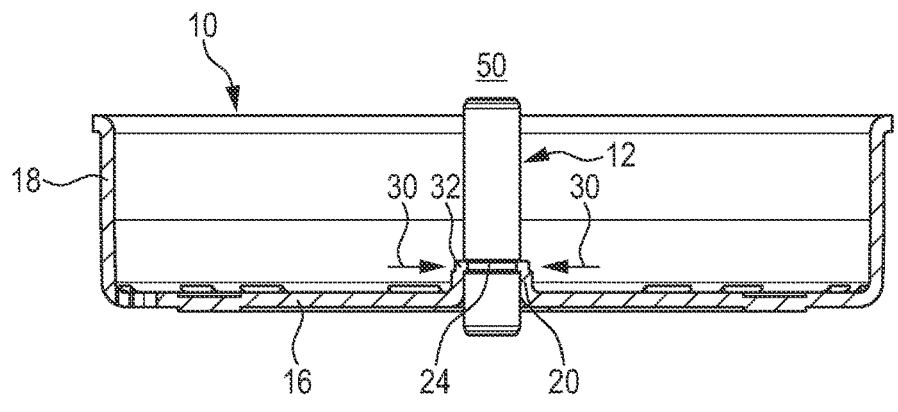
FIG. 4 shows a section corresponding to FIGS. 1 and 3, in a further stage of the method for firmly connecting the shaft to the rotor-housing part.

In order to achieve a higher press-out force than is achieved by an interference fit, in the method for firmly connecting the shaft 12 to the rotor-housing part 10, material of the bearing flange 20 is introduced, in a further step, into the recess 24 of the shaft 12. This is indicated in FIG. 4 by arrows 30.

As a result of material of the bearing flange 20 being introduced into the recess 24 of the shaft 12, the press-out force that causes the shaft 12 to shift in an axial direction relative to the bearing flange 20 is considerably increased. As a result, press-out forces of 5 kN or even above 7 kN can be achieved, this not being achievable with an interference fit in such a short bearing flange 20 alone.

The introduction of material of the bearing flange 20 into the recess 24 can be accomplished in that a bead 32 in the form of a full or half bead is formed in the bearing flange 20 from an outer side of the bearing flange 20. In the exemplary embodiment shown in FIG. 4, a half bead is introduced into the bearing flange 20. A half bead is appropriate here given the very short axial length of the bearing flange 20. If the bearing flange 20 has a greater axial length, the shaft 12 can be inserted into the bearing flange such that the recess 24 is not located at the end 26 of the bearing flange 20, as is shown in FIG. 3, but is located more deeply in the bearing flange 20. In this case, provision can also be made to form a full bead in the bearing flange 20, in order in this way to introduce material of the bearing flange 20 into the recess 24.

The introduction of material of the bearing flange 20 into the recess 24 is preferably carried out by means of a roller burnishing tool, wherein such a roller burnishing tool will be described in more detail below. In other exemplary embodiments, the material of the bearing flange 20 can be introduced into the recess 24 by means of a slider, a forming tool, a pressing tool or plier tool. Material of the bearing flange 20 can also be introduced into the recess 24 only in portions or only around part of the circumference in the circumferential direction of the recess, provided that the desired press-out force is achieved. Irrespective thereof, the recess 24 can extend over the full circumference around the shaft 12, and likewise, the bead 32 can extend over the full circumference around the bearing flange 20 in the circumferential direction thereof.

During the introduction of material of the bearing flange 20 into the recess 24, the latter does not have to be completely filled with the material of the bearing flange 20. Depending on the press-out force to be achieved, 30% to 50% filling of the recess 24 with the material of the bearing flange 20 may be enough in order to achieve the requisite press-out force. A higher degree of filling increases the press-out force.

FIG. 4 shows the rotor-housing part 10 with the firmly mounted shaft 12. The shaft 12 is fixed to the rotor-housing part 10 so as to be immovable both in the direction of the axis 14 and in the direction of rotation about the axis 14, and exhibits high resistance to shifting relative to the bearing flange 20.

The rotor-housing part 10 can be part of a rotor of an electric motor (not illustrated in more detail), for example of an electric motor of a fan, as can be used in a motor vehicle as part of the engine cooling system.

Figure 5:
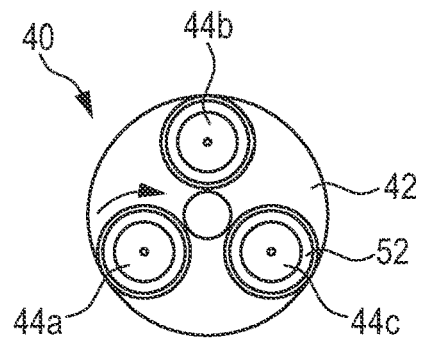
FIG. 5 shows a plan view of a roller burnishing tool that can be used in the method for firmly connecting the shaft to the rotor-housing part.
Figure 6:
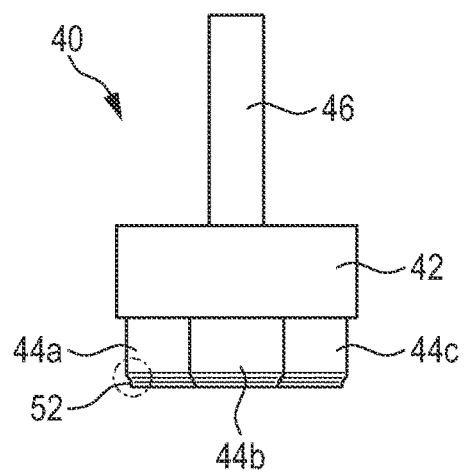
FIG. 6 shows a side view of the tool in FIG. 5.

FIGS. 5 and 6 show a roller burnishing tool 40 that can be used in the method step according to FIG. 4 in order to introduce material of the bearing flange 20 into the recess 24 of the shaft 12. By way of the roller burnishing tool 40, in particular the bead 32, in this case in the form of a half bead, can be formed in the bearing flange 20 from the outer side thereof.

The roller burnishing tool 40 has a main body 42, which on one side is connected to a drive shaft 46 and on the other side bears three rollers 44a, 44b and 44c. The rollers 44a, 44b, 44c are mounted in a rotatable manner on the main body 42, as is indicated by an arrow 48 for the roller 44a.

The rollers 44a, 44b, 44c are spaced apart from one another to such an extent that they can be fitted over the shaft 12 from one side 50 in FIG. 4, until the roller burnishing faces 52 of the rollers 44a, 44b, 44c are arranged at the level of the recess 24 of the shaft 12 and can come into engagement with the bearing flange 20 on the outer side thereof. As a result of the main body 42 being rotated via the drive shaft 46, the outer side of the bearing flange 20 is roller burnished in the region of its end 26 by means of the rollers 44a, 44b, 44c until the bead 32 has been formed and the amount of material of the bearing flange 20 that is required for the press-out force to be achieved has been introduced into the recess 24.

Figure 7:
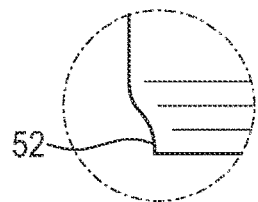
FIG. 7 shows an enlarged detail from FIG. 6.

FIG. 7 shows, in an enlarged detail, the roller burnishing face 52 of the roller 44a, the shaping of which is particularly suitable for forming a half bead. In this case, the roller burnishing face 52 is slightly indented radially. If a full bead is intended to be roller burnished, a roller burnishing face is suitable that protrudes radially outwards from the rest of the body of the roller (not illustrated).

What is claimed is:

1. A rotor-housing part, comprising:
   a bearing flange, and
   a shaft having a recess on an outer circumference of the shaft, the recess extending in a circumferential direction about a longitudinal axis of the shaft,
   wherein the shaft is inserted in the bearing flange, wherein material of the bearing flange engages in the recess such that the shaft is connected to the bearing flange, wherein a press-out force of the shaft in at least one press-out direction is at least 5 kN at a temperature of 23° C.

2. The rotor-housing part according to claim 1, further comprising a bead on the bearing flange.

3. The rotor-housing part according to claim 2, wherein the bead is either a full bead, or a half bead.

4. The rotor-housing part according to claim 2, wherein the bead extends around an entire circumference, in a circumferential direction, of the bearing flange.

5. The rotor-housing part according to claim 1, wherein the recess extends around an entire circumference, in a circumferential direction, of the shaft.

6. The rotor-housing part according to claim 1, wherein the shaft is oversize relative to the bearing flange, and the shaft is pressed into the bearing flange with an interference fit.

7. The rotor-housing part according to claim 1, further comprising a rotor-housing part formed from sheet-metal, wherein a bottom portion of the formed sheet-metal is punched and plunged to produce the bearing flange.

8. The rotor-housing part according to claim 1, wherein at least 30% of the recess is filled with a material of the bearing flange.

9. The rotor-housing part according to claim 1, wherein at least 50% of the recess is filled with a material of the bearing flange.

10. The rotor-housing part according to claim 1, wherein an axial length of the bearing flange is less than half an axial length of the shaft.

11. The rotor-housing part according to claim 1, wherein the press-out force of the shaft in the at least one press-out direction is at least 7 kN at a temperature of 23° C.

* * * * *